United States Patent [19]

Zinner

[11] Patent Number: 5,040,930
[45] Date of Patent: Aug. 20, 1991

[54] CUTTING TOOL
[75] Inventor: Karl Zinner, Nuremberg, Fed. Rep. of Germany
[73] Assignee: Zinner GmbH Präzisionswerkzeuge, Nuremberg, Fed. Rep. of Germany
[21] Appl. No.: 485,196
[22] Filed: Feb. 26, 1990
[30] Foreign Application Priority Data Mar. 11, 1989 [DE] Fed. Rep. of Germany ....... 3907922

[51] Int. Cl.⁵ .............................................. B23P 15/28
[52] U.S. Cl. .................................... 407/114; 407/117
[58] Field of Search .............. 407/113, 114, 115, 116, 407/117

[56] References Cited
U.S. PATENT DOCUMENTS

| D. 304,949 | 12/1989 | Niebauer | 407/114 |
| 3,815,192 | 6/1974 | Ohtsu | 407/114 |
| 4,214,845 | 7/1980 | Mori | 407/114 |
| 4,215,957 | 8/1980 | Holma et al. | 407/114 |
| 4,273,480 | 6/1981 | Shirai | 407/114 |
| 4,304,509 | 12/1981 | Mori | 407/114 |
| 4,318,645 | 3/1982 | McCreery | 407/116 |
| 4,479,744 | 10/1984 | Stricker | 407/114 |
| 4,487,534 | 12/1984 | Reiter | 407/114 |
| 4,629,371 | 12/1986 | Maeda | 407/114 |
| 4,859,122 | 8/1989 | Patterson | 407/116 |
| 4,934,879 | 6/1990 | Von Barneveld | 407/116 |

Primary Examiner—Frederick R. Schmidt
Assistant Examiner—B. Shideler
Attorney, Agent, or Firm—Jordan and Hamburg

[57] ABSTRACT

The invention relates to a cutting tool, particularly a carving insert or cutter bit, which is exchangeable in tool holders in each case has a cutting wedge, which is adjacent to a face, one or several nubs in the form of spherical segments, truncated cones and/or truncated pyramids being formed on the face.

26 Claims, 3 Drawing Sheets

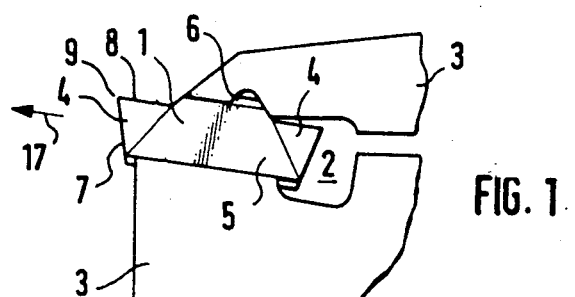
FIG. 1
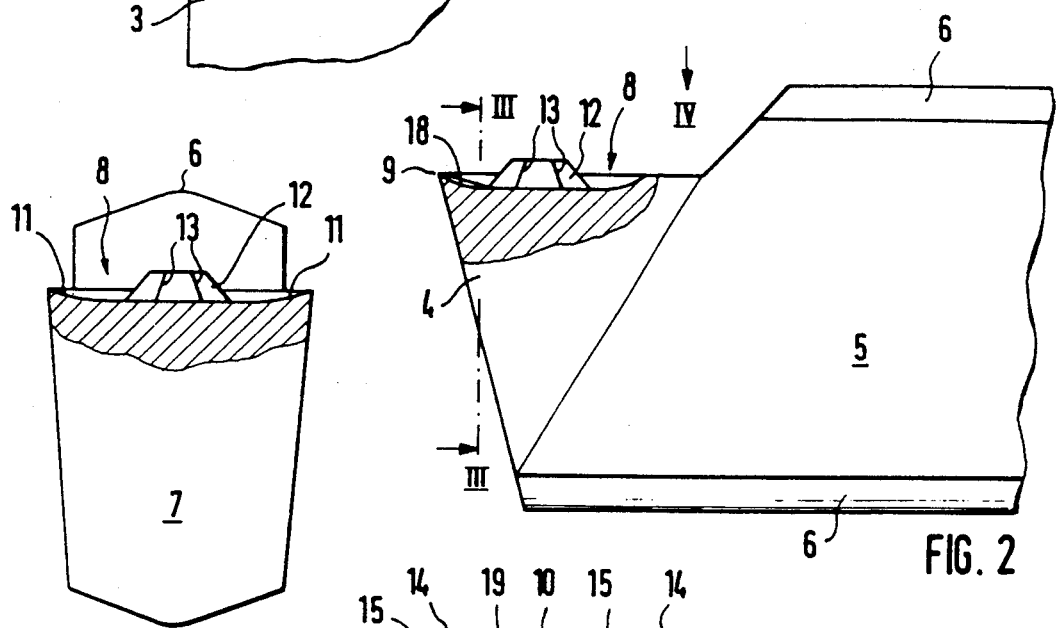
FIG. 2
FIG. 3
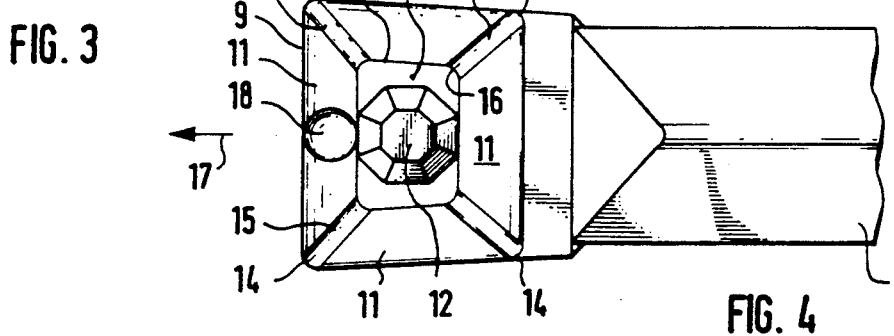
FIG. 4
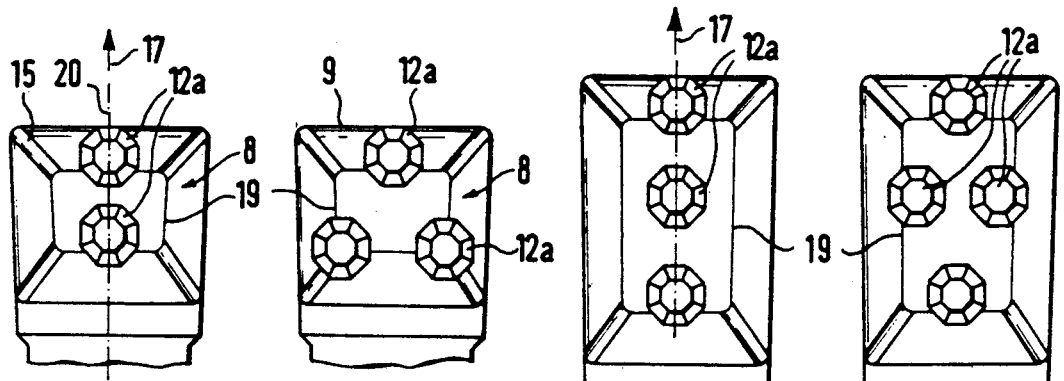
FIG. 5   FIG. 6   FIG. 7   FIG. 8

CUTTING TOOL

BACKGROUND OF THE INVENTION

The invention relates to a cutting tool, particularly a carving insert or cutter bit, which is exchangeable in tool holders and in each case has a cutting wedge, which is adjacent to a face.

An exchangeable cutter bit for metal cutting tools is known (German Patent No. 30 50 925), in which a honed land is interposed between the cutting edge and the subsequent face. Starting out from this honed land, one or several ribs extend vertically away from the cutting edge and preferably in the middle between two mutually opposite sides of the face. This rib serves for the deformation of the slivers, which are sheared off by the cutting edge and which particularly are to be rolled up and constricted laterally thereby. In many applications, however, the achievable shortening of the sliver relative to the sheared off width is unsatisfactory.

The object, on which the invention is based, follows from this. This object is to avoid the above-mentioned disadvantages of a cutting tool and to make possible an improved sliver flow control on the face of the tool particularly in such a manner that, immediately after the shearing process, the sliver length is shortened significantly. Pursuant to the invention, this objective is accomplished owing to the fact that one or several nubs, which are raised on the face and have the shape of spherical segments or truncated cones and/or truncated pyramids, are provided on the face.

After the shearing process has been accomplished, the longitudinal, coherent sliver that is formed can impact on the nub in correspondence with the (high) cutting speed. The one or also several nubs separate the sliver along its length into one or several parts, so that two, three, four, etc. sliver parts result. It is obvious that these are significantly shorter than the slivers originally sheared off. The loose, individual sliver parts, so separated, do not become creased as readily in the workpiece, the tool or in the machine tool and consequently the reliability and safety of the processing of the workpiece is increased as a whole.

In a further development of the invention, the face is provided with a central region and one or several edge sections, which surround this central region all around, rise obliquely relative to it and end in edges, which it shares in common with the free surfaces of the cutting wedge. In other words, the face has a central region, which is depressed relative to its end regions or sections. With this, the advantage is achieved that the sliver, before impacting on a nub, already is bent along its length corresponding to the depression and therefore shortened relative to the sheared off width. Before it is then coiled to a tight spiral because of the stresses existing in the sliver, it impacts on one or several of said nubs and is severed into individual pieces.

In this connection, a special development of the invention consists therein that the central region and the edges of the face, shared in common with the free surfaces, are connected by one or several groove-like depressions, which extend between the edge sections. By these means, the sliver flow is conducted precisely and in an intensified manner from the outer edges to the central region of the face and, if necessary, to the nubs disposed in the central region. With particular advantage, these depressions are constructed as grooves extending in straight lines and, if the face and the central region disposed in its interior are, in each case, polygonal, serve as connecting channels between the corner edges of the face (which are shared in common with the free surfaces) and the corner sections of its central region. Since the sliver flow is concentrated according to a further development of this concept towards the center of the face, it is appropriate to dispose one or several nubs there, that is, in the central region of the face. On the other hand, it is within the scope of the invention that at least one nub is disposed directly adjoining to its cutting edge. With this alternative, the sliver which has just been severed, is still in its most deformable state when it strikes the nub for the purpose of comminution.

A further development of the invention serves for the conveyance of a uniform, continuous flow of slivers as well as for the efficient utilization of the available face. Pursuant to this development, the nubs are distributed symmetrically over the face. In this sense, it is particularly appropriate to dispose the individual nubs corresponding to the corners of an equilateral triangle or a parallelogram and/or in an alignment parallel or corresponding to the central longitudinal axis of the tool.

In connection with the subdivision of a face into a central region and edge regions, an advantageous further development consists therein that one or several nubs extend in each case on either side of the boundary line between the central region and the edge section. On the one hand, the sliver that has just been sheared off is conducted to the nub in a still highly deformable state and, on the other, the already comminuted slivers can collect in the central region and than impact on subsequent nubs for further comminution. For the purpose of the previously explained preliminary shortening of the sliver before the severance by a nub, a depression for deforming the sliver, preferably in spherical segment form, is provided ahead of the nub. By these means, the sliver is bent corresponding to its longitudinal course and possibly, because of the sharp edges, which are formed by the spherical depression and the surrounding face, already severed into two or three parts. In this sense, it is appropriate to dispose the depression directly adjoining the cutting edge of the tool and therefore to have it act on the sliver while the latter is in its most deformable state.

A special development of the invention, in which the subdivision of the face into the central region and the edge sections, as well as the provision of the depression immediately at the cutting edge are combined advantageously in their effects, consists therein that the depression extends from the cutting edge over the edge section to the opposite boundary line to the central region and that the nub, which follows the depression, extends in the central region from this boundary line to the opposite boundary line and the edge section adjoining thereon. Aside from concentrating the sliver flow to the centrally disposed nub, such an arrangement accomplishes that especially the section of the sliver, bent in the center by the depression, strikes the nub; the highest mechanical stresses are encountered in the section bent in the center, so that the sliver, in proportion to the cutting speed, can be divided all the more easily into individual pieces by impact on the nub.

An alternative solution of the initially named objective, which lies within the scope of the inventive idea, consists therein that at least one concave or convex spherical cap is formed on the face adjoining the cutting wedge of a cutting tool. With the provision of a positive or negative spherical cap, there is created on the face an outwardly or inwardly arched or curved surface, on which the severed sliver accommodates and consequently shortens itself in its longitudinal course. In an appropriate further development of the invention to promote the impact of the sliver on the spherical cap, a straight or inclined sliver inlet is added, which borders immediately on the cutting edge of the tool. The transport of sliver, that have just been severed, away from the cutting edge is promoted by a further development, according to which the edges of the spherical cup, which are disposed laterally relative to the advancing direction, run perpendicular to the cutting edge of the tool. At the same time, the spherical cap can be countersunk spherically at the end facing away from the advancing direction, that is, the end opposite to the clamping shaft of the tool insert.

Advantageously, one or several rib-like elevations are formed around the spherical cap. As these elevations approach the edges of the face adjoining the free surfaces, they become flatter, preferably gradually, and go over into groove-like depressions. An example of an embodiment of this concept consists therein that the elevations together are disposed so as to form an H shape with bent or swung lines and end in the corner regions of the face as grooves. The thereby resulting cross member of the H divides the face into a front and a rear region and the spherical cap advantageously is formed in the front region, that is, in the advancing direction, before the cross member.

Further characteristics, details and advantages arise out of the following description of preferred example of the operation of the invention, as well as out of the drawing, in which the following are shown.

BRIEF DESCRIPTION OF THE DRAWINGS

FIG. 1 shows a side elevation of the principle of the holding device for an exchangeable tool insert.

FIG. 2 shows a partially cut, enlarged side elevation of an inventive tool insert.

FIG. 3 shows a partially cut front elevation approximately along line III—III of FIG. 2.

FIG. 4 shows a plan view approximately in the direction IV of FIG. 2.

FIGS. 5-17 show plan views of tool inserts corresponding approximately to the direction IV in FIG. 2, in each case with sliver guiding geometries, which have been modified pursuant to the invention.

DESCRIPTION OF THE PREFERRED EMBODIMENTS

Figure 9:
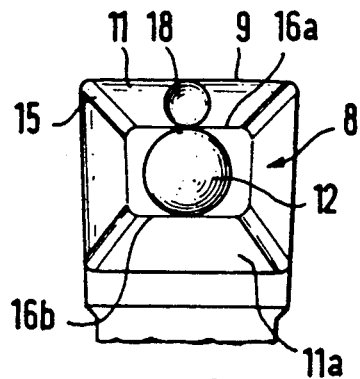
Figure 10:
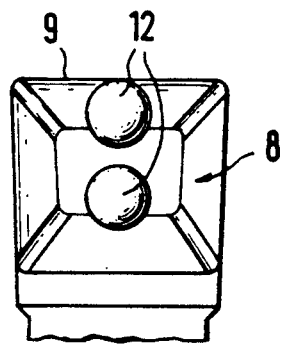
Figure 11:
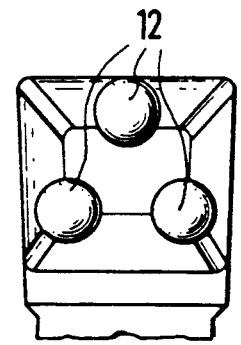
Figure 12:
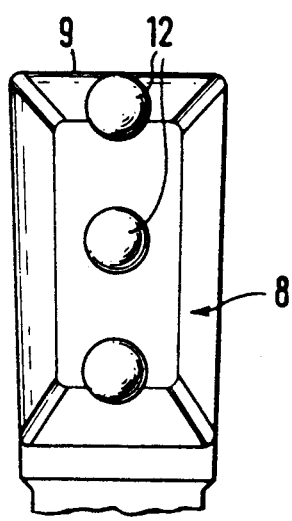
Figure 13:
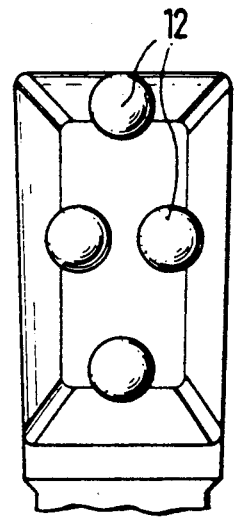

FIG. 1 illustrates the clamping of a tool insert 1 in the gripper slot 2 between the truncated jaws 3 of a tool holder. As drawn in the example, the tool insert 1 is a parting tool with two cutting wedges 4 disposed at opposite ends. Between these, the clamping shaft 5 with the prismatic guide 6 is formed. The cutting wedges 4 are bounded by free surfaces 7 and faces 8, which together form the cutting edge 9 of the cutting tool insert 1.

According to the example of the operation shown in FIGS. 2 to 4, the face 8 is divided into a tetragonal central region 10, which is disposed approximately centrally, and the edge section 11, which surrounds the central region 10 completely and which, relative to the central region 10, rises up to the edges of the face 8. On the central region 10 of the face 8, a nub 12 arises in the form of a truncated pyramid, with the corner edges 13 corresponding to the base of a pyramid. The example drawn is an octagonal pyramid base. Basically, however, a pyramid base with fewer or more corners can be used. The thereby resulting pyramidal corner edges 13 are particularly advantageous for the aimed for comminution of the slivers; the sliver-severing action is increased as the edges become sharper.

The face 8 as well as the central region 10, which is delineated in its interior, have essentially a tetragonal base, their adjacent sides in each case being parallel to one another. From the corner edges 14 at the edge of face 8, groove-like depressions 15 in each case lead to the nearest corner sections 16 of the central region 10. By means of this construction of the sliver guiding geometry, a centering of the sliver flow to the centrally disposed nub 12 is achieved. When viewed in front elevation counter to the advancing direction 17, a sliver-deforming depression 18, which deepens the surface of the edge section 11 adjoining the cutting edge 9 in the form of a spherical segment, is provided in front of the nub 12. In the advancing direction 17, the depression 18 or the nub 12 traverses the associated edge section 11 or the central region 10 completely, so that the boundary edge 19, which differentiates the central region 10 from the edge sections 11, also touches the edges of the depression 19 and the nub 12.

As indicated in FIGS. 5 to 8, various other possibilities for the disposal of the nubs for the purpose of guiding the sliver flow are given on the basis of the inventive concept. According to FIGS. 5 and 7, two or three nubs 12 are placed one after the other in an alignment corresponding to the advancing direction 17. At the same time, the first and last nubs 12a cross or interrupt the boundary edge 19, that is, they extend into one of the edge sections 11, which in each case are separated from one another by a groove-like depression 15, as well as into the central region 10. According to FIGS. 6 and 8, three or four nubs 12 are disposed in such a manner, that an equilateral triangle or a quadrangle in the form of a parallelogram is formed by the lines that connect them.

Figure 14:
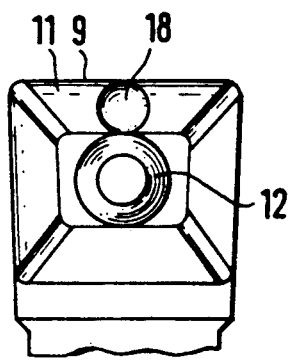
Figure 15:
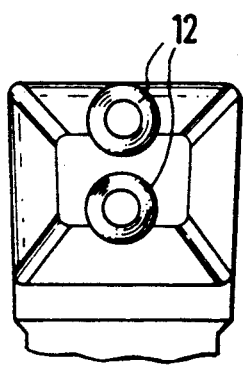
Figure 16:
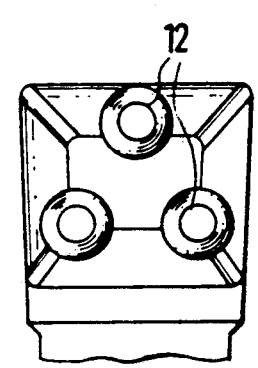

The examples of the operation shown in FIGS. 9 to 13 are identical with the examples of the operation described previously, however, with the exception that the nubs 12 have the shape of a spherical segment rather than that of a truncated pyramid. The corresponding also can be said about the examples of the operation of FIGS. 14 to 16, in which the nubs 12 have the shape of a truncated cone instead of that of the previously mentioned truncated pyramid or spherical segment.

Figure 17:
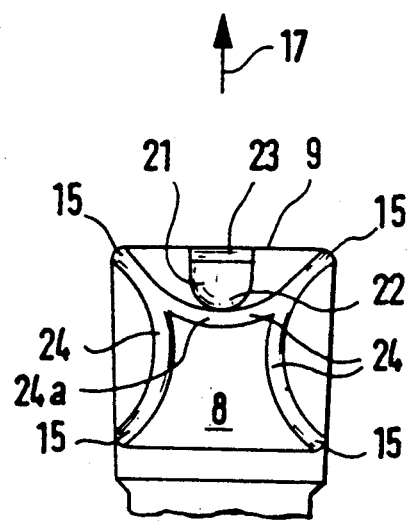

The sliver guiding geometry of FIG. 17 differs from that of the preceding examples particularly owing to the fact that, in the region of the cutting edge 9, a spherical cap 21, which can be a concave depression or a convex elevation, is molded into face 8. The side edges of the spherical cap extend largely perpendicularly with respect to the cutting edge 9, and the end 22, opposite to the advancing direction 17, is provided with a spherical countersink. Between the cutting edge 9 and the spherical cap 21, an inlet 23 is disposed, which conveys the sliver flow to the spherical cap 21. The surface of the inlet can be bevelled with respect to the face 8 and recessed towards the inside or elevated towards the outside. In the latter case, in particular, it forms a honed land. Moreover, according to the example of the operation of FIG. 17, ribs 24 are provided, which are bent in the longitudinal course and the overall arrangement of which approximates the shape of an H. The free ends of the ribs, gradually flattening, in each case change into grooves 15, which are recessed with respect to the face 8 and are in the corner regions of the face 8. The (middle) rib 24a, forming the cross member of the H shape, classifies the face 8 into, with respect to the advancing direction 17, front and rear regions, the spherical cap 21 being disposed in the front region.

I claim:

1. A cutting tool operable to be used when fed in a feed direction perpendicular to the axis of a workpiece being cut by the cutting tool, said cutting tool having a front face and an upper face, said upper face having outer edges of which a front part of said outer edges intersect said front face to define a cutting edge, said cutting edge being disposed generally perpendicular to said feed direction, said upper face having a depressed central area and an inclined border section surrounding said central area and rising from said central area to said outer edges of said upper face, raised nub means on said central area, said border section having a front border part extending between said cutting edge and said central area, a chip deforming means on said front border part for deforming the chip cut by said cutting edge, and groove means in said border section between said central area and said outer edges of said upper face.

2. A cutting tool according to claim 1, wherein said chip deforming means is a depression in said front border part.

3. A cutting tool according to claim 2, wherein said depression has a spherical configuration.

4. A cutting tool according to claim 1, wherein said chip deforming means is a second raised nub means extending upwardly from said front border part.

5. A cutting tool according to claim 1, wherein said central area has a polygonal configuration having corners, said groove means extending from at least one of said corners.

6. A cutting tool according to claim 1, wherein said outer edges of said upper face has a polygonal configuration having corners, said groove means extending from at least one of said corners.

7. A cutting tool according to claim 1, wherein said central area has a polygonal configuration with first corners, said outer edges of said upper face having a polygonal configuration with second corners, said groove means comprising a groove extending between at least one first corner and one second corner.

8. A cutting tool according to claim 1, wherein said groove means comprises at least one linear groove depression in said border section.

9. A cutting tool according to claim 1, wherein said front face has lateral ends, said groove means comprising at least one groove which extends to at least one of said lateral ends of said front face of said cutting tool.

10. A cutting tool according to claim 1, wherein said cutting edge extends linearly and has longitudinal ends, said groove means comprising a groove extending to at least one of said longitudinal ends.

11. A cutting tool operable to be used when fed in a feed direction perpendicular to the axis of a workpiece being cut by the cutting tool, said cutting tool having a front face and an upper face, said upper face having outer edges of which a front part of said outer edges intersect said front face to define a cutting edges, said cutting edge being disposed perpendicular to said feed direction, said upper face having a depressed central area and an inclined border section surrounding said central area and rising from said central area to said outer edges of said upper face, first raised nub means disposed on at least a part of said central area, said border section having a front border portion extending between said cutting edge and said central area, second raised nub means disposed on at least a part of said front border portion, and groove means in said border section extending between said central area and said outer edges of said upper face.

12. A cutting tool according to claim 11, wherein said second raised nub means extends to said cutting edge.

13. A cutting tool according to claim 11, wherein said second raised nub means extends onto said central area.

14. A cutting tool according to claim 11, wherein said first and second raised nub means comprise three raised nubs disposed at the corners of an equilateral triangle.

15. A cutting tool according to claim 11, wherein said first and second raised nub means comprise four raised nubs disposed at the four corners of a parallelogram.

16. A cutting tool according to claim 11, wherein said cutting tool has a central longitudinal axis parallel to said feed direction, said first and second raised nub means comprising three raised nubs disposed along a linear line extending generally parallel to said longitudinal axis.

17. A cutting tool according to claim 11, wherein a boundary line delineates said central area from said border section, said second nub means extending over said boundary line to be partly disposed on said central area.

18. A cutting tool according to claim 11, wherein a boundary line delineates said central area from said border section, said first raised nub means extending over said boundary line to be partly disposed on said border section.

19. A cutting tool according to claim 11, wherein a boundary line delineates said central area from said border section, said second raised nub means extending from said cutting edge and extending over said boundary line to be partly disposed on said central area.

20. A cutting tool according to claim 11, wherein a boundary line delineates said central area from said border section, said central area having a polygonal configuration with corners, said first raised nub means comprising at least one raised nub disposed at at least one of said corners and extending onto said border section.

21. A cutting tool operable to be used when fed in a feed direction perpendicular to the axis of a workpiece being cut by the cutting tool, said cutting tool having a front face and an upper face, said upper face having outer edges of which a front part of said outer edges intersect said front face to define a cutting edge, said cutting edge being disposed perpendicular to said feed direction, said outer edges intersecting the ends of said cutting edge at two corners, said upper face having delineating means extending from said two corners and away from said cutting edge to define a delineated upper face section between said cutting edge and said delineating means, a raised nub means in said delineated upper face section, a guide surface between said cutting edge and said raised nub means for guiding chips to said raised nub means, said delineating means comprising a first section formed as a raised rib extending upwardly from said upper face, said delineating means comprising a pair of second sections extending from said first section and which are formed as grooves in said upper face, said grooves extending to said two corners.

22. A cutting tool according to claim 21, wherein said outer edges have two other corners, and raised rib projections extending from said delineating means to said other two corners such that said delineating means and said raised rib projections have a generally H-shaped configuration.

23. A cutting tool according to claim 21, wherein said delineating means gradually changes from said ribs to said grooves as said corners are approached.

24. A cutting tool according to claim 21, wherein said raise nub means has a rear portion spaced from said cutting edge, said rear portion having a partial spherical configuration.

25. A cutting tool according to claim 21, wherein said raised nub means has side edges which extend perpendicular to said cutting edge.

26. A cutting tool operable to be used when fed in a feed direction perpendicular to the axis of a workpiece being cut by the cutting tool, said cutting tool having a front face and an upper face, said upper face having outer edges of which a front part of said outer edges intersect said front face to define a cutting edge, said cutting edge being disposed perpendicular to said feed direction, said outer edges intersecting the ends of said cutting edge at two corners, said upper face having delineating means extending from said two corners and away from said cutting edge to define a delineated upper face section between said cutting edge and said delineating means, a concave depression in said delineated upper face section, a guide surface between said cutting edge and said raised nub means for guiding chips to said raised nub means, said delineating means comprising a first section formed as a raised rib extending upwardly from said upper face, said delineating means comprising a pair of second sections extending from said first section and which are formed as grooves in said upper face, said grooves extending to said two corner.

* * * * *